(12) United States Patent
Oka (10) Patent No.: US 7,018,105 B2
(45) Date of Patent: Mar. 28, 2006

(54) BEARING ASSEMBLY WITH TEMPERATURE SENSOR

(75) Inventor: Ryutaro Oka, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/972,949

(22) Filed: Oct. 10, 2001

(65) Prior Publication Data

US 2002/0051593 A1    May 2, 2002

(30) Foreign Application Priority Data

Oct. 31, 2000    (JP) .............................. 2000-331586

(51) Int. Cl.
  *F16C 32/00*    (2006.01)
(52) U.S. Cl. ...................................... 384/448
(58) Field of Classification Search ................ 384/448, 384/571, 557; 374/153; 277/317; 324/173, 324/174
  See application file for complete search history.

(56) References Cited

U.S. PATENT DOCUMENTS

| | | | |
|---|---|---|---|
| 4,946,296 A * | 8/1990 | Olschewski et al. ........ | 384/448 |
| 5,372,435 A * | 12/1994 | Genero et al. .............. | 384/448 |
| 5,381,090 A * | 1/1995 | Adler et al. ................ | 324/174 |
| 5,399,027 A * | 3/1995 | Ijuin et al. .................. | 384/475 |
| 5,431,413 A * | 7/1995 | Hajzler ....................... | 277/317 |
| 5,433,525 A * | 7/1995 | El-Ibiary .................... | 384/448 |
| 5,468,072 A * | 11/1995 | Ekdahl et al. .............. | 384/448 |
| 5,833,371 A * | 11/1998 | Gomez et al. .............. | 384/448 |
| 6,161,962 A * | 12/2000 | French et al. .............. | 384/448 |
| 6,179,471 B1 * | 1/2001 | Moretti et al. ............. | 384/448 |
| 6,559,633 B1 * | 5/2003 | Nachtigal et al. ........... | 324/174 |

FOREIGN PATENT DOCUMENTS

JP     58-50115 A  *  3/1983  ................ 72/342.4

* cited by examiner

*Primary Examiner*—Thomas Williams
*Assistant Examiner*—Mariano Sy (57) ABSTRACT

To provide a bearing assembly having a temperature sensor built therein, in which the accuracy of detection of the abnormal temperature is increased, the number of component parts is reduced and the productivity can be increased, a rolling bearing assembly (1) includes a sealing member (7) secured to a stationary bearing ring and a temperature sensor (13) is secured to the sealing member (7). The stationary bearing ring is an inner race (2) if the bearing assembly (1) is of an outer race rotating type. The sealing member (7) is made up of a core metal 9 and an elastic member (10) made of a rubber or resin. The temperature sensor (13) is fixed to the core metal (9) of the sealing member (7) either by means of an insert molding of the elastic member (10) or soldering after forming the sealing member (7). The temperature sensor (13) is in the form of a chip-type laminar thermistor.

7 Claims, 5 Drawing Sheets

BEARING ASSEMBLY WITH TEMPERATURE SENSOR

BACKGROUND OF THE INVENTION

1. Field of the Invention

The present invention generally relates to a bearing assembly of a kind whose temperature needs to be monitored and, more particularly, to the bearing assembly having a temperature sensor built therein, suitable for use in, for example, wheel bearings and shaft bearings used in railway vehicles.

2. Description of the Prior Art

In shaft bearing assemblies employed in railway vehicles, one or more temperature sensors which are a member separate from the bearing assembly are incorporated in a housing for the bearing assembly for detection of the temperature of a surface of the housing so that an abnormal temperature evolved in the bearing assembly can be detected.

It has, however, been found that with the sensor-equipped bearing assembly now in use, the following problems have been involved:

(1) Since the temperature sensor used therein does not detect the temperature of the bearing assembly directly, the timing at which the abnormal temperature is detected tends to be retarded, resulting in that at the time of actual detection of the abnormal temperature, the bearing assembly would have already damaged detrimentally. Once this occurs, determination of a cause of the abnormal temperature would be virtually futile.

(2) Since the temperature sensor is a member separate from the bearing assembly, a space for installation thereof is required within a limited space available in the bearing assembly.

(3) Because of the temperature sensor being a member separate from the bearing assembly, the number of component parts in the bearing assembly as a whole tends to increase, resulting in complicated and time-consuming servicing operations. While it is a general practice to replace the bearing assembly regularly during a cycle checkout, replacement of the temperature sensor is also required separate from and independently of the replacement of the bearing assembly and, accordingly, complicated and time-consuming procedures are required in performing a job of replacement.

(4) Considering that the temperature sensor is secured to an outside of a bearing box forming a part of the bearing assembly, the temperature sensor is susceptible to damage or malfunctioning by collision with scattered stones and/or rocks, resulting in false generation of an erroneous signal indicative of detection of the abnormal temperature.

Figure 8:
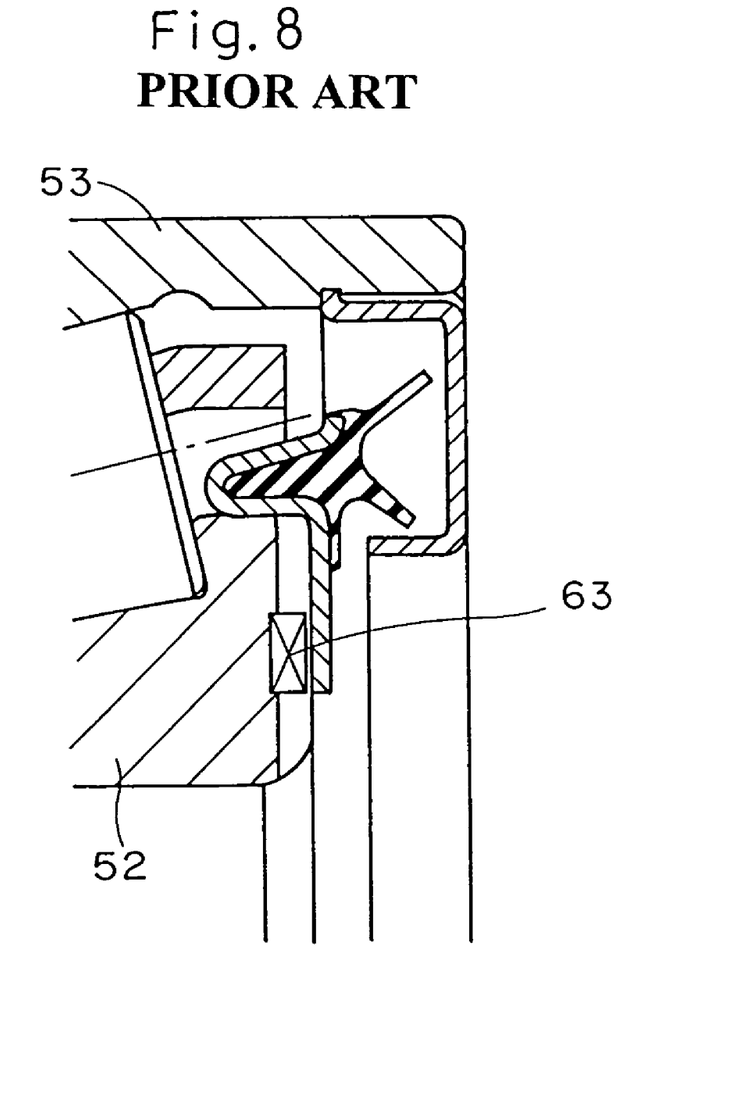
FIG. 8 is a view similar to FIG. 2, showing the prior art bearing assembly having the temperature sensor built therein.

Also, the prior art wheel bearing assembly used in railway vehicles has been well known, in which as shown in FIG. 8, a temperature sensor 63 in the form of a thermocouple or the like is disposed on one end face of an inner race 52 that forms a stationary bearing ring. An outer race 53 of the wheel bearing assembly is positioned radially outwardly of the inner race 52 with rolling elements interposed therebetween and has its outer peripheral surface secured to a corresponding wheel (not shown) while forming a rotatable bearing ring.

The prior art wheel bearing assembly shown in FIG. 8 is effective to directly measure the temperature of the bearing assembly itself. However, since the temperature sensor 63 is designed to be carried by the inner race which is one of the bearing rings forming the bearing assembly, mounting of the temperature sensor on the inner race is difficult to achieve, resulting in reduction in productivity.

SUMMARY OF THE INVENTION

Accordingly, the present invention is so devised as to provide an improved bearing assembly having a temperature sensor built therein, in which the accuracy of detection of the abnormal temperature is increased, the number of component parts is reduced and the productivity can be increased.

To achieve the foregoing object of the present invention, there is provided a rolling bearing assembly having a temperature sensor built therein, which bearing assembly includes stationary and rotary bearing rings one positioned inside the other; and a sealing member secured to the stationary bearing ring. The temperature sensor is secured to the sealing member for measuring a temperature inside the bearing assembly.

With this structure, the temperature sensor is secured to the sealing member which is a part of the bearing assembly and, therefore, the temperature inside the bearing assembly can be directly detected, resulting in increase in preciseness in temperature detection. Also, since the temperature sensor is integrated together with the bearing assembly, the number of component parts used can be reduced. In addition, since the temperature sensor is secured to the sealing member which is, unlike a bearing ring, a component part accessory to the bearing assembly, the temperature sensor can be simply and easily secured to the sealing member during manufacture of the sealing member, resulting in high productivity of the bearing assembly having the temperature sensor built therein. Yet, since the temperature sensor is secured to the sealing member that is mounted on a stationary bearing ring, a wiring cable extending from the temperature sensor can easily be drawn outwardly from the bearing assembly.

In one preferred embodiment of the present invention, the sealing member includes a core metal fitted to the stationary bearing ring, and an elastic member made of rubber or resin and integrated together with the core metal and wherein the temperature sensor is secured to the core metal in contact therewith. Since the core metal is a metallic member secured to the bearing ring, the temperature of the bearing ring can be effectively and efficiently conducted to the temperature sensor, making it possible to achieve an accurate temperature detection.

In another preferred embodiment of the present invention, the core metal includes a cylindrical portion mounted on a peripheral surface of the stationary bearing ring which confronts the rotary bearing ring, a flange portion engaged to at least one annular end face of the stationary bearing ring, and a slant portion bent from an inner end of the cylindrical portion so as to extend diagonally radially therefrom and wherein the temperature sensor is disposed within a space delimited by and between the cylindrical portion and the slant portion. By this preferred design, the temperature sensor can be protected.

In a further preferred embodiment of the present invention, the temperature sensor is fixed to the sealing member by means of an integral molding of the elastic member with the core metal. This can be easily accomplished by the use of an insert molding technique to allow the temperature sensor to be fixedly encapsulated by the elastic member.

Where the insert molding technique is used to secure the temperature sensor to the sealing member, fixing of the temperature sensor can be easily achieved. For this reason, not only can the productivity of the sealing member equipped with the temperature sensor be increased, but also the quality of securement of the temperature sensor can be stabilized.

In a still further preferred embodiment of the present invention, the temperature sensor is a chip-type laminar thermistor. Since the chip-type laminar thermistor is known to have a compact structure, a high sensitivity and a high readiness, the temperature sensor can be efficiently and effectively accommodated by the sealing member.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Preferred embodiments of the present invention will now be described with reference to the accompanying drawings.

Figure 1:
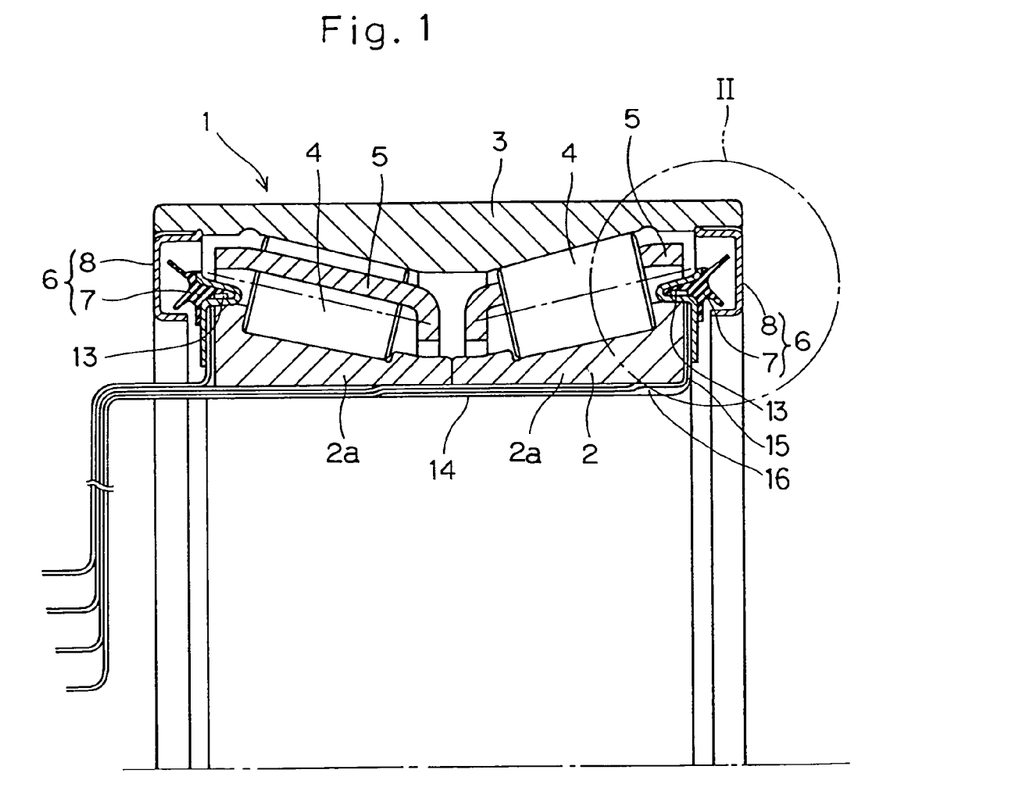
FIG. 1 is a fragmentary longitudinal sectional view of a bearing assembly having a temperature sensor built therein according to a first preferred embodiment of the present invention, showing only one of longitudinal halves of the bearing assembly.
Figure 4:
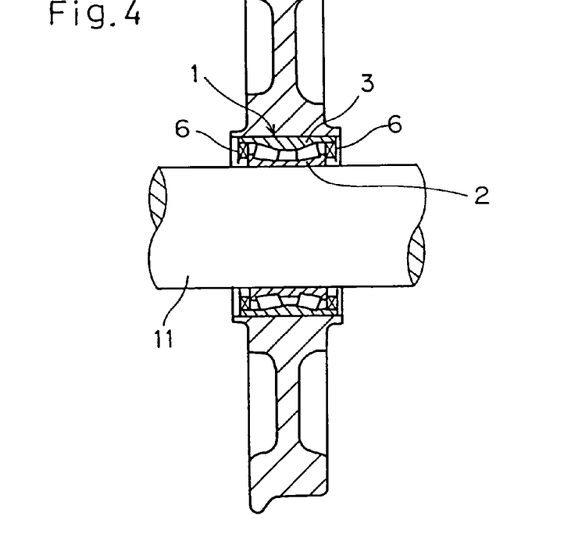
FIG. 4 is a sectional view, showing an application of the bearing assembly of the present invention in rotatably supporting a railway vehicle wheel.

Referring first to FIG. 1, there is shown, in a fragmentary longitudinal sectional representation, a bearing assembly having a temperature sensor built therein according to a first preferred embodiment of the present invention. This bearing assembly is shown in FIG. 4 as used in rotatably supporting a railway vehicle wheel. The bearing assembly 1 shown therein is of an outer race rotating type and includes two bearing rings which are an inner race 2 and an outer race 3, respectively. Of these bearing rings, the inner race 2 serves as a stationary bearing ring and is fixedly mounted on an axle 11 as shown in FIG. 4. The outer race 3 serving as a rotary bearing ring is fixedly mounted inside a hub of the railway vehicle wheel 12.

In a first embodiment shown in FIG. 1, the bearing assembly 1 includes a plurality of rolling elements 4 rotatably retained by a retainer or cage 5 and rollingly interposed between the inner and outer races 2 and 3 in the form as retained by the retainer 5, and an annular sealing means 6 for sealing each of opposite annular ends of a working space defined between the inner and outer races 2 and 3. The illustrated bearing assembly is in the form of a double row roller bearing assembly, more specifically a double row tapered roller bearing assembly, and the retainer or cage 5 is used for each row of the rolling elements 4. The inner race 2 is of a split type made up of two axially split inner race segments 2a and 2a held in axially end-to-end abutment with each other and each having an integral collar. The outer race 3 is of integrity and has an axial length greater than that of the inner race 2 (i.e., the total axial length of the inner race segments 2a and 2a) with its opposite end portions protruding an equal length axially outwardly from the adjacent ends of the inner race 2.

Figure 2:
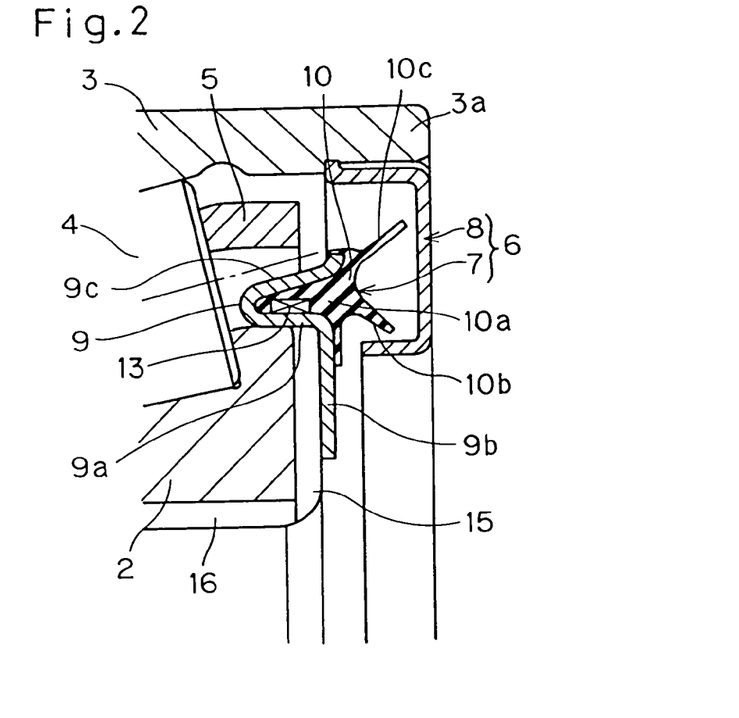
FIG. 2 is a fragmentary sectional view, showing on an enlarged scale a portion of the bearing assembly encompassed within the circle II shown in FIG. 1.

As shown in FIG. 2 on an enlarged scale of that portion of the bearing assembly encompassed by the circle II shown in FIG. 1, the sealing means 6 for each annular end of the working space between the inner and outer races 2 and 3 includes an annular inner sealing member 7 secured to the inner race 2 and an annular outer sealing member 8 secured to the outer race 3. A temperature sensor 13 as will be described in detail later is mounted on the inner sealing member 7 secured to the inner race 2.

The outer sealing member 8 secured to the outer race 3 is in the form of a metallic ring of a generally U-shaped section opening towards the annular space between the outer and inner races 3 and 2. This outer sealing member 8 is press-fitted into the corresponding end portion 3a of the outer race 3 that protrude axially outwardly from the adjacent end of the inner race 2 and has an inner diameter slightly smaller than the outer diameter of the corresponding end of the inner race 2.

The inner sealing member 7 secured to the inner race 2 includes a core metal 9 fixedly mounted on the corresponding end of the inner race 2 and an elastic member 10 integrated together with the metal core 9 and is rendered to be an oil seal. The core metal 9 is made up of a cylindrical portion 9a mounted on an outer peripheral surface of the inner race 2 which surface confronts the outer race 3, a flange portion 9b continued from the cylindrical portion 9a so as to extend radially inwardly along the corresponding end face of the inner race 2, and a slant portion 9c bent backwardly from an inner end of the cylindrical portion 9a so as to extend diagonally radially outwardly therefrom with the cylindrical portion 9a and the slant portion 9c defining a generally V-shaped section.

The elastic member 10 is made of an elastic material such as, for example, natural or synthetic rubber or resin and is made up of a ring-shaped body 10a and a pair of flexible lips 10b and 10c protruding laterally outwardly from the ring-shaped body 10a so as to diverge outwardly towards the outer sealing member 8. The ring-shaped body 10a is so disposed as to fill up a generally V-sectioned gap delimited between the cylindrical portion 9a and the slant portion 9c of the core metal 9 while the flexible lips 10b and 10c have their free ends positioned spaced a slight distance inwardly from an web portion of the outer sealing member 8 and a radially inner flange of the outer sealing member 8, respectively.

The sealing means 6 constituted by the inner and outer sealing members 7 and 8 is a non-contact type seal design in which no contact takes place between the inner and outer sealing members 7 and 8. However, if desired, the flexible lips 10b and 10c may extend laterally outwardly from the ring-shaped body 10a to such an extent that the free ends thereof may be held in sliding contact with the web portion and radially inner flange of the outer sealing member 8 to thereby render the sealing means 6 to be of a contact type design.

The temperature sensor 13 referred to hereinabove is disposed in contact with the core metal 9 of the inner sealing member 7 and is enclosed by the elastic member 10. More specifically, during an insert molding process in which the elastic member 10 is integrated together with the core metal 9 to complete the inner sealing member 7, the temperature sensor 13 prefitted to the core metal 9 in contact therewith is embedded in the inner sealing member 7. This temperature sensor 13 so embedded is positioned on the cylindrical portion 9a and within the generally V-sectioned gap delimited between the cylindrical portion 9a and the slant portion 9c. With the temperature sensor 13 so embedded, the temperature sensor 13 can be effectively protected. In the illustrated embodiment, the temperature sensor 13 is employed in the form of a thermistor, for example, a laminar thermistor fabricated into a sensor chip.

Figure 3:
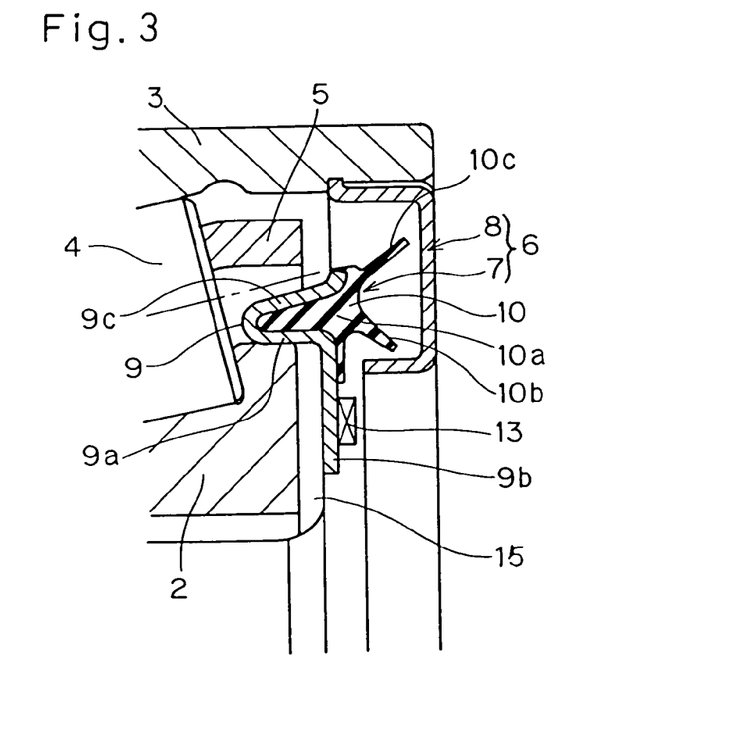
FIG. 3 is a view similar to FIG. 2, showing the bearing assembly according to a second preferred embodiment of the present invention.

Although the temperature sensor 13 has been described and shown as fixed in position relative to the inner sealing member 7 by enclosing it with the elastic member 10, any other suitable method may be employed to achieve this. By way of example, the temperature sensor 13 may be rigidly secured to a portion of the core metal 9 which is clear of the inner sealing member 7 as in a second preferred embodiment shown in FIG. 3. In such case, a soldering technique may be employed to rigidly secure the temperature sensor 13 to that portion of the core metal 9. Also, the position of the core metal 9 at which the temperature sensor 13 is fixed may not be always limited to an area of the flange portion 9a of the core metal 9 that is clear of the elastic member 10 such as shown in FIG. 3, but the temperature sensor 13 may be positioned on any portion of the core metal 9 that is not covered by the elastic member 10.

A wiring cable 14 shown in FIG. 1 extending from the temperature sensor 13 is laid in a radially extending groove 15 defined in the corresponding end face of the inner race 2 so as to extend radially inwardly from the temperature sensor 13. The wiring cable 14 extending within the radial groove 15 is then laid in an axial groove 16, defined in the inner peripheral surface of the inner race 2, so as to extend axially towards a similar wiring cable 14 extending from the temperature sensor 13 on the opposite end of the inner race 2. The wiring cables 14 from the temperature sensors 13 on the opposite ends of the inner race 2 are then bundled together and drawn outwardly from the bearing assembly for electric connection with a temperature diagnosing means (not shown).

With the bearing assembly having the temperature sensor built therein in accordance with each one of the first and second embodiments of the present invention, since the temperature sensor 13 is secured to the core metal 9 of the inner sealing member 7 which is susceptible to change in temperature as a function of change in temperature of the bearing assembly, detection of the temperature of the core metal 9 leads to detection of the temperature inside the bearing assembly and, accordingly, with high accuracy, it is possible to detect whether or not the temperature inside the bearing assembly increases beyond a critical value, i.e., to detect an abnormal temperature occurring inside the bearing assembly. If the inner sealing member 7 is of a non-contact type, the temperature of the core metal 9 will attain to a value about equal to the temperature inside the bearing assembly, whereas if the inner sealing member 7 is of a contact type, it will attain a value higher than that inside the bearing assembly by about 30 to 50°C. Accordingly, depending on the specification of the inner sealing member 7 to be employed, a determined temperature setting of a determining means is carried out for the determination of the abnormal temperature.

Also, since the temperature sensor 13 is integrated together with the inner sealing member 7, the bearing assembly 1 is thus of a design integrated with the temperature sensor 13 and the number of independent and separate components used to complete the bearing assembly is thus reduced. Accordingly, servicing of the bearing assembly including a replacement of the bearing can easily be performed.

In addition, in each one of the illustrated embodiments, the temperature sensor 13 is installed inside the bearing assembly, while being secured to the inner sealing member 7. Accordingly, no extra space for installation of the temperature sensor 13 is needed and the possibility of the temperature sensor 13 being damaged upon collision with scattered stones and/or rocks which leads to false generation of the detection signal can advantageously be eliminated.

Yet, since the temperature sensor 13 is secured by the inner sealing member 7 which is a component part accessory to the bearing assembly, unlike the case in which it is mounted on the inner race 2, the temperature sensor 13 can be easily and simply secured by the inner sealing member 7, resulting in increase of the productivity of the bearing assembly 1 having the temperature sensor 13 built therein. Also, since the chip-type laminar thermistor is used for the temperature sensor 13, fixture to and embedding in the inner sealing member 7 can easily be achieved with the structure compact in size, high in sensitivity and high in readiness.

Figure 5:
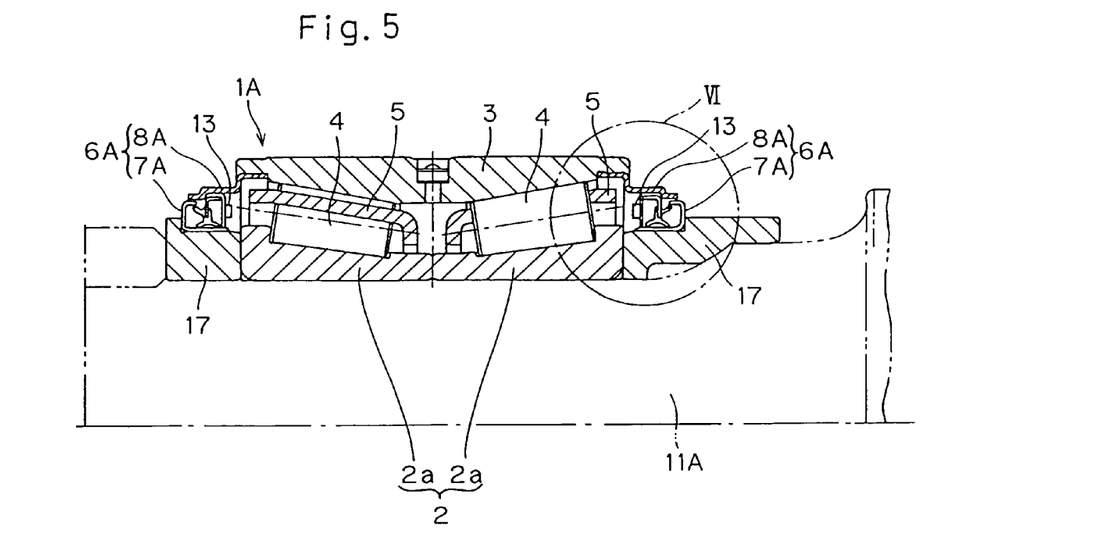
FIG. 5 is a fragmentary longitudinal sectional view of the bearing assembly according to a third preferred embodiment of the present invention, with only one of the longitudinal halves thereof being shown.
Figure 6:
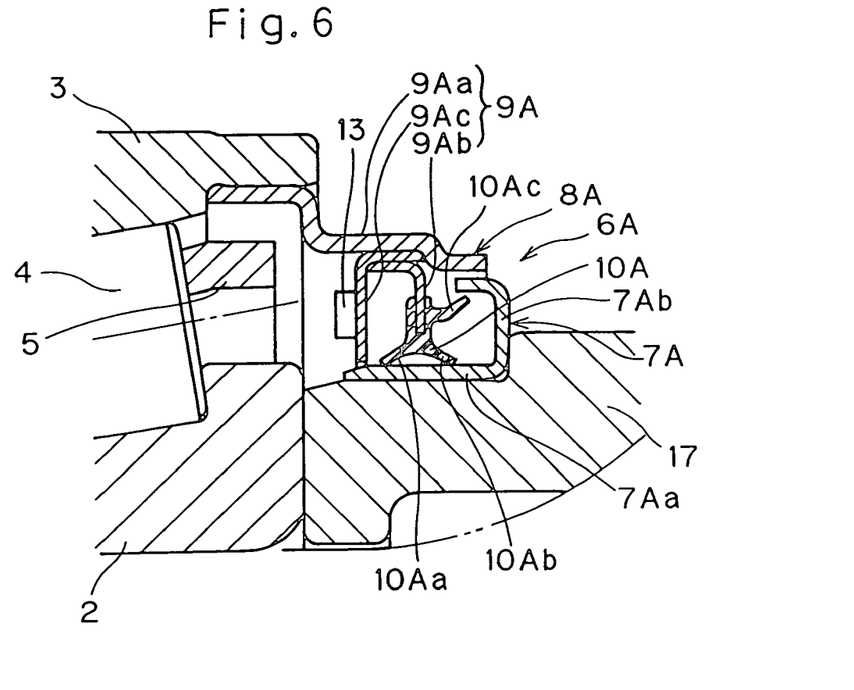
FIG. 6 is a fragmentary sectional view, showing on an enlarged scale a portion of the bearing assembly encompassed within the circle VI shown in FIG. 5.

FIGS. 5 and 6 illustrates a third embodiment of the present invention in which the present invention is applied to the bearing assembly 1A of an inner race rotating type. In describing the second embodiment of the present invention, it is to be noted that unless otherwise specified, component parts shown therein and referenced by the same reference numerals as used in connection with the previously described first embodiment will not be reiterated for the sake of brevity as they are substantially identical with those shown in FIGS. 1 to 4.

In the embodiment, as shown in FIG. 5, the outer race 3 is fixed to the inner peripheral surface of a housing (not shown) whereas the inner race 2 is fixedly mounted on an axle 11A. Accessories 17 which serve as an oil slinger and an end closure, respectively, are mounted on different portions of the axle 11A adjacent the opposite ends of the inner race 2. The sealing means 6A is disposed between these accessories 17 and the outer race 3.

As shown in FIG. 6, the sealing means 6A on each end of the inner race 2 includes a radially inner sealing member 7A mounted on the corresponding accessory 17, and a radially outer sealing member 8A mounted to the outer race 3. The temperature sensor 13 is fixed on the radially outer sealing member 8A secured to the outer race 3 which is a stationary bearing ring. The radially inner sealing member 7A secured to the accessory 17 is made of a metallic material and includes a cylindrical portion 7Aa, mounted on an outer peripheral surface of the accessory 17, and a flange portion 7Ab continued from one end of the cylindrical portion 7Aa and lying perpendicular to the cylindrical portion 7Aa so as to extend radially outwardly therefrom.

The radially outer sealing member 8A secured to the outer race 3 includes a core metal 9A and an elastic member 10A integrated together with the metal core 9A by the use of an insert molding technique. The temperature sensor 13 is fixed to the core metal 9A by the use of, for example, a soldering technique. The elastic member 10A is made of an elastic material such as, for example, natural or synthetic rubber or resin and includes a plurality of, for example, three flexible lips 10Aa to 10Ac. The core metal 9A includes a cylindrical seal casing member 9Aa made of a metallic material and secured at one end to the inner peripheral surface of the outer race 3, a generally intermediate portion of cylindrical seal casing member 9Aa being stepped at two locations, a core metal portion 9Ab, and a labyrinth seal portion 9Ac. The core metal portion 9Ab and the labyrinth seal portion 9Ac are fixed to an inner peripheral surface of the seal casing member 9Aa. The elastic member 10A is integrated together with the core metal portion 9Ab. The core metal portion 9Ab and the elastic member 10A are positioned axially inwardly of the flange portion 7Ab of the radially inner sealing member 7A. The labyrinth seal portion 9Ac is positioned axially inwardly of the core metal portion 9Ab, while the temperature sensor 13 is fixed to one of opposite side surfaces of the labyrinth seal portion 9Ac which confronts the interior of the bearing assembly 1A. The temperature sensor 13 is, as is the case in the first embodiment shown in FIGS. 1 and 2, in the form of a chip-type laminar thermistor.

Figure 7:
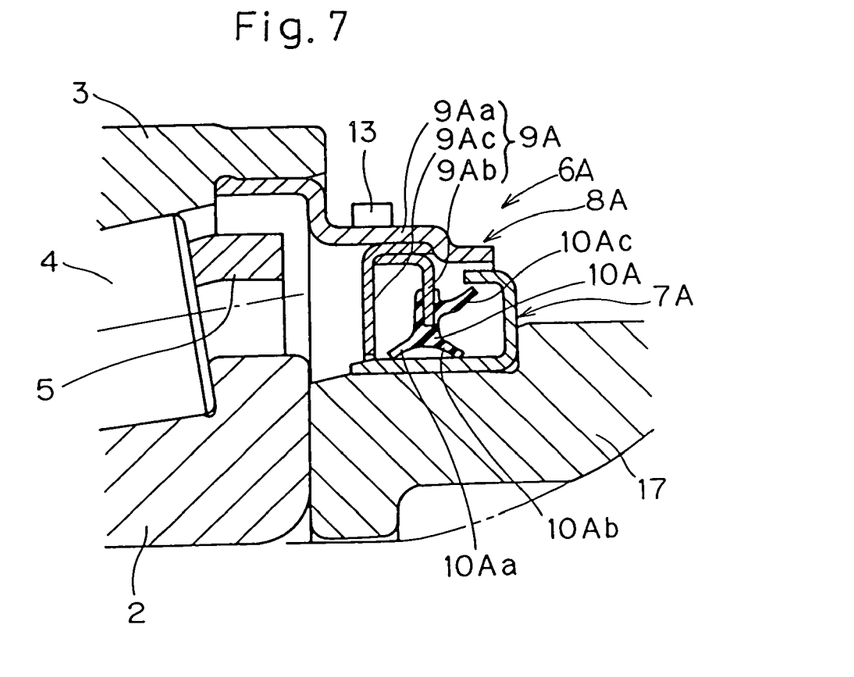
FIG. 7 is a view similar to FIG. 6, showing the bearing assembly according to a fourth preferred embodiment of the present invention.

It is to be noted that the temperature sensor 13 may not be fixed to the labyrinth seal portion 9Ac such as described above, but may be fixedly mounted on, for example, an outer peripheral surface of the seal casing member 9Aa as in a fourth preferred embodiment shown in FIG. 7.

Even with the bearing assembly 1A of the inner race rotating type, the temperature sensor 13 is fitted to the sealing means 6A that is mounted on the outer race 3 which serves as the stationary bearing ring. Accordingly, the temperature of the bearing assembly can be detected accurately with high precision, the number of component parts used can be reduced advantageously and the productivity can also be increased.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rolling bearing assembly having a temperature sensor built therein, which bearing assembly comprises:
    stationary and rotary bearing rings one positioned inside the other;
    a sealing member secured to the stationary bearing ring; and
    the temperature sensor secured to the sealing member to measure a temperature inside the bearing assembly,
    wherein the sealing member includes a plate-like core metal fitted to the stationary bearing ring, and an elastic member made of one of rubber or resin and integrated together with the core metal, and
    the temperature sensor is secured to a plate surface of the core metal in contact therewith, at an intermediate portion of the core metal, to determine a temperature of the core metal.

2. The rolling bearing assembly as claimed in claim 1, wherein the temperature sensor is directly molded with the elastic member.

3. The rolling bearing assembly as claimed in claim 1, wherein the temperature sensor does not contact the elastic member.

4. A rolling bearing assembly having a temperature sensor built therein, which bearing assembly comprises:
    stationary and rotary bearing rings one positioned inside the other;
    a sealing member secured to the stationary bearing ring; and
    the temperature sensor secured to the sealing member to measure a temperature inside the bearing assembly,
    wherein the sealing member includes a plate-like core metal fitted to the stationary bearing ring, and an elastic member made of one of rubber or resin and integrated together with the core metal and wherein the temperature sensor is secured to a plate surface of the core metal in contact therewith, to determine a temperature of the core metal, and
    the core metal includes a cylindrical portion mounted on a peripheral surface of the stationary bearing ring which confronts the rotary bearing ring, a flange portion engaged to at least one annular end face of the stationary bearing ring, and a slant portion bent from an inner end of the cylindrical portion so as to extend diagonally radially therefrom and wherein the temperature sensor is disposed within a space delimited by and between the cylindrical portion and the slant portion.

5. A rolling bearing assembly including stationary and rotary bearing rings, one positioned inside the other, and a temperature sensor, the rolling bearing assembly comprising:
    a sealing member secured to the stationary bearing ring and comprising a core metal end an elastic member made of one of rubber or resin and integrated together with the core metal, the temperature sensor contacting and being affixed to a plate surface of the core metal, at an intermediate portion of the core metal, and determining a temperature of the core metal.

6. The rolling bearing assembly as claimed in claim 5, wherein the temperature sensor is directly molded with the elastic member.

7. The rolling bearing assembly as claimed in claim 5, wherein the temperature sensor does not contact the elastic member.

* * * * *

UNITED STATES PATENT AND TRADEMARK OFFICE
CERTIFICATE OF CORRECTION

| | |
|---|---|
| PATENT NO. | : 7,018,105 B2 |
| APPLICATION NO. | : 09/972949 |
| DATED | : March 28, 2006 |
| INVENTOR(S) | : Ryutaro Oka |

It is certified that error appears in the above-identified patent and that said Letters Patent is hereby corrected as shown below:

Column 8, line 47, change "end" to --and--

Signed and Sealed this

Tenth Day of April, 2007

JON W. DUDAS
*Director of the United States Patent and Trademark Office*